United States Patent
Henry et al.

(10) Patent No.: US 11,064,193 B2
(45) Date of Patent: Jul. 13, 2021

(54) METHODS AND DEVICES FOR ENCODING AND DECODING A DATA STREAM REPRESENTATIVE OF AN IMAGE SEQUENCE

(71) Applicant: ORANGE, Paris (FR)

(72) Inventors: Felix Henry, Chatillon (FR); Joel Jung, Chatillon (FR); Bappaditya Ray, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/628,486

(22) PCT Filed: Jun. 28, 2018

(86) PCT No.: PCT/FR2018/051581
§ 371 (c)(1),
(2) Date: Jan. 3, 2020

(87) PCT Pub. No.: WO2019/008255
PCT Pub. Date: Jan. 10, 2019

(65) Prior Publication Data
US 2020/0128239 A1  Apr. 23, 2020

(30) Foreign Application Priority Data
Jul. 5, 2017 (FR) ...................... 1756320

(51) Int. Cl.
*H04N 19/105* (2014.01)
*H04N 19/136* (2014.01)
(Continued)

(52) U.S. Cl.
CPC ......... *H04N 19/105* (2014.11); *H04N 13/286* (2018.05); *H04N 13/289* (2018.05);
(Continued)

(58) Field of Classification Search
CPC ......... H04N 2013/0081; H04N 13/286; H04N 13/289; H04N 13/356; H04N 13/359;
(Continued)

(56) References Cited

U.S. PATENT DOCUMENTS 6,215,898 B1 *   4/2001   Woodfill ................. G06K 9/32
                                                    382/154
2014/0028793 A1 *   1/2014   Wiegand .............. H04N 19/109
                                                    348/42
(Continued)

OTHER PUBLICATIONS

International Search Report dated Jan. 8, 2019 for corresponding International Application No. PCT/FR2018/051581, filed Jun. 28, 2018.
(Continued)

*Primary Examiner* — David N Werner
(74) *Attorney, Agent, or Firm* — David D. Brush; Westman, Champlin & Koehler, P.A.

(57) ABSTRACT

A method for decoding a data stream representative of an image sequence. At least one current block of a current image in the image sequence is encoded using a predictor block of a reference image, the predictor block being identified in the reference image via location information. An information item enabling the reference image to be identified from a set of reference images is obtained. When the reference image satisfies a predetermined criterion, the location information of the predictor block is decoded using a first decoding mode, otherwise the location information of the predictor block is decoded using a second decoding mode, the first and second decoding modes including at least a different decoding parameter. The current block is then reconstructed from the predictor block.

9 Claims, 5 Drawing Sheets

(51) Int. Cl.

| | | |
|---|---|---|
| *H04N 19/176* | (2014.01) | |
| *H04N 19/70* | (2014.01) | |
| *H04N 13/286* | (2018.01) | |
| *H04N 13/356* | (2018.01) | |
| *H04N 13/359* | (2018.01) | |
| *H04N 13/289* | (2018.01) | |
| *H04N 19/103* | (2014.01) | |
| *H04N 19/107* | (2014.01) | |
| *H04N 19/109* | (2014.01) | |
| *H04N 19/11* | (2014.01) | |
| *H04N 19/157* | (2014.01) | |

(52) U.S. Cl.
CPC ......... *H04N 13/356* (2018.05); *H04N 13/359* (2018.05); *H04N 19/103* (2014.11); *H04N 19/107* (2014.11); *H04N 19/109* (2014.11); *H04N 19/11* (2014.11); *H04N 19/136* (2014.11); *H04N 19/157* (2014.11); *H04N 19/176* (2014.11); *H04N 19/70* (2014.11)

(58) Field of Classification Search
CPC .. H04N 19/103; H04N 19/105; H04N 19/107; H04N 19/109; H04N 19/11; H04N 19/157
See application file for complete search history.

(56) References Cited

U.S. PATENT DOCUMENTS

| | | | |
|---|---|---|---|
| 2014/0092998 A1 | 4/2014 | Zhu et al. | |
| 2014/0098189 A1* | 4/2014 | Deng | H04N 19/51 348/43 |
| 2014/0354771 A1 | 12/2014 | Wang et al. | |
| 2016/0234510 A1* | 8/2016 | Lin | H04N 19/597 |
| 2016/0330471 A1 | 11/2016 | Zhu et al. | |
| 2016/0353117 A1 | 12/2016 | Seregin et al. | |
| 2017/0134743 A1 | 5/2017 | Sim et al. | |
| 2017/0310994 A1* | 10/2017 | Seo | H04N 19/105 |
| 2018/0302645 A1 | 10/2018 | Laroche et al. | |

OTHER PUBLICATIONS

Written Opinion of the International Searching Authority dated Jan. 8, 2019 for corresponding International Application No. PCT/FR2018/051581, filed Jun. 28, 2018.
Shan Liu et al., "Overview of HEVC extensions on screen content coding", 11-15 APSIPA Transactions on Signal and Information Processing, vol. 4, Jan. 1, 2015 (Jan. 1, 2015), XP055454972.
Chen Y et al., "Test Model 11 of 3D-HEVC and MV-HEVC", 11. JCT-3V Meeting; Feb. 12, 2015-Feb. 18, 2015; Geneva; (The Joint Collaborative Team on 3D Video Coding Extension Development of ISO/IEC JTC1/SC29/WG11 and ITU-T SG.16 ); URL: http://phenix.int-evry.fr/jct2/,, No. JCT3V-K1003, May 1, 2015 (May 1, 2015), XP030132748.
Chen Y et al., "AHG10: Motion related hooks for HEVC multiview/3DV extension based on long-term reference pictures", 10. JCT-VC Meeting; 101. MPEG Meeting; Jul. 11, 2012-Jul. 20, 2012, Stockholm, (Joint Collaborative Team on Video Coding of ISO/IEC JTC1/SC29/WG11 and ITU-T SG.16 ); URL: http://wftp3.itu.int/av-arch/jctvc-site/,, No. JCTVC-J0121. Jul. 3, 2012 (Jul. 3, 2012), XP030112483.
Samelak Jaroslaw et al:., "Efficient frame-compatible stereoscopic video coding using HEVC screen content coding", 2017 International Conference on Systems, Signals and Image Processing (IWSSIP), IEEE, May 22, 2017 (May 22, 2017), pp. 1-5, XP033112648.
Detlev Marpe, Heiko Schwarz, and Thomas Wiegand "Context-Based Adaptive Binary Arithmetic Coding in the H.264/AVC Video Compression Standard", IEEE Transactions on Circuits and Systems for Video Technology, vol. 13, No. 7, Jul. 2003.
Gary J. Sullivan et al., "Overview of the High Efficiency Video Coding (HEVC) Standard", IEEE Transactions on Circuits and Systems for Video Technology, vol. 22, No. 12, Dec. 2012.
English translation of the Written Opinion of the International Searching Authority dated Jan. 18, 2019 for corresponding International Application No. PCT/FR2018/051581, filed Jun. 28, 2018.
International Search Report dated Oct. 9, 2018, for corresponding International Application No. PCT/FR2018/051579, filed Jun. 28, 2018.
English translation of the International Written Opinion dated Oct. 22, 2018, for corresponding International Application No. PCT/FR2018/051579, filed Jun. 28, 2018.
International Search Report dated Oct. 9, 2018, for corresponding International Application No. PCT/FR2018/051580 filed Jun. 28, 2018.
English translation of the International Written Opinion dated Oct. 22, 2018, for corresponding International Application No. PCT/FR2018/051580, filed Jun. 28, 2018.
Philipp Helle et al., "BLock Merging for Quadtree-Based Partitioning in HEVC", IEEE Transaction on Circuits and Systems for Video Technology, Institut of Electrical and Electronics Engineers, USA, vol. 22, No. 12, Dec. 1, 2012 (Dec. 1, 2012), pp. 1720-1731, XP011487155.
Anonymous: "Study Text of ISO/IEC 14496-10:200X/FPDAM 1", 88. MPEG Meeting; Apr. 20, 2009-Apr. 29, 2009; MAUI; (Motion Picture Expert Group or ISO/IEC JTC1/SC29/WG11),, No. N10540, Apr. 25, 2009 (Apr. 25, 2009), XP030017039.
Li B. et al., "Non-SCCE1: Unification of intro BC and inter modes", 18. JCT-VC Meeting; Jun. 30, 2014-Jul. 9, 2014; Sapporo; (Joint Collaborative Team on Video Coding of ISO/IEC JTC1/SC29/WG11 and ITU-T SG.16); URL: http://wtp3.itu.int/av-arch/jctvc-site/,, No. JCTVC-R0100-v2, Jun. 29, 2014 (Jun. 29, 2014), XP030116357.
Jaroslaw Samelak et al., "Experimental Results for Frame Compatible Multiview Video Coding Using HEVC SCC" 26. JCT-VC Meeting; Jan. 12, 2017-Jan. 20, 2017; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-Z0041, Jan. 13, 2017 (Jan. 13, 2017), XP030118149.
Laroche G. et al., "AHG10: On IBC memory reduction", Joint Collaborative Team on Video Coding (JCT-VC) of ITU-T SG 16 WP 3 and ISO/IEC JTC 1/SC 29/WG 11, 20th Meeting: Geneva, CH, 10-18, Document JCTVC-T0051, dated Feb. 9, 2015.
Final Office Action dated Nov. 2, 2020 for corresponding U.S. Appl. No. 16/628,467, filed Jan. 3, 2020.
Office Action dated Jul. 13, 2020 for corresponding U.S. Appl. No. 16/628,470, filed Jan. 3, 2020.
Final Office Action dated Dec. 16, 2020 for corresponding U.S. Appl. No. 16/628,470, filed Jan. 3, 2020.
ISO/IEC/23008-2 Recommendation ITU-T H.265 High Efficiency Video Coding (HEVC).
Office Action dated Jun. 15, 2020 for corresponding U.S. Appl. No. 16/628,467, filed Jan. 3, 2020.
Office Action dated Mar. 4, 2021 for corresponding U.S. Appl. No. 16/628,467, filed Jan. 3, 2020.
Office Action dated May 27, 2021 for U.S. Appl. No. 16/628,470, filed Jan. 3, 2020.

* cited by examiner

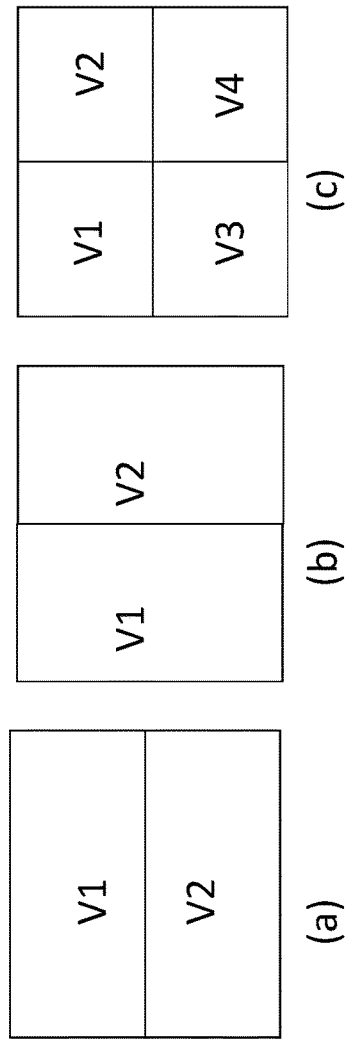
FIG. 2A
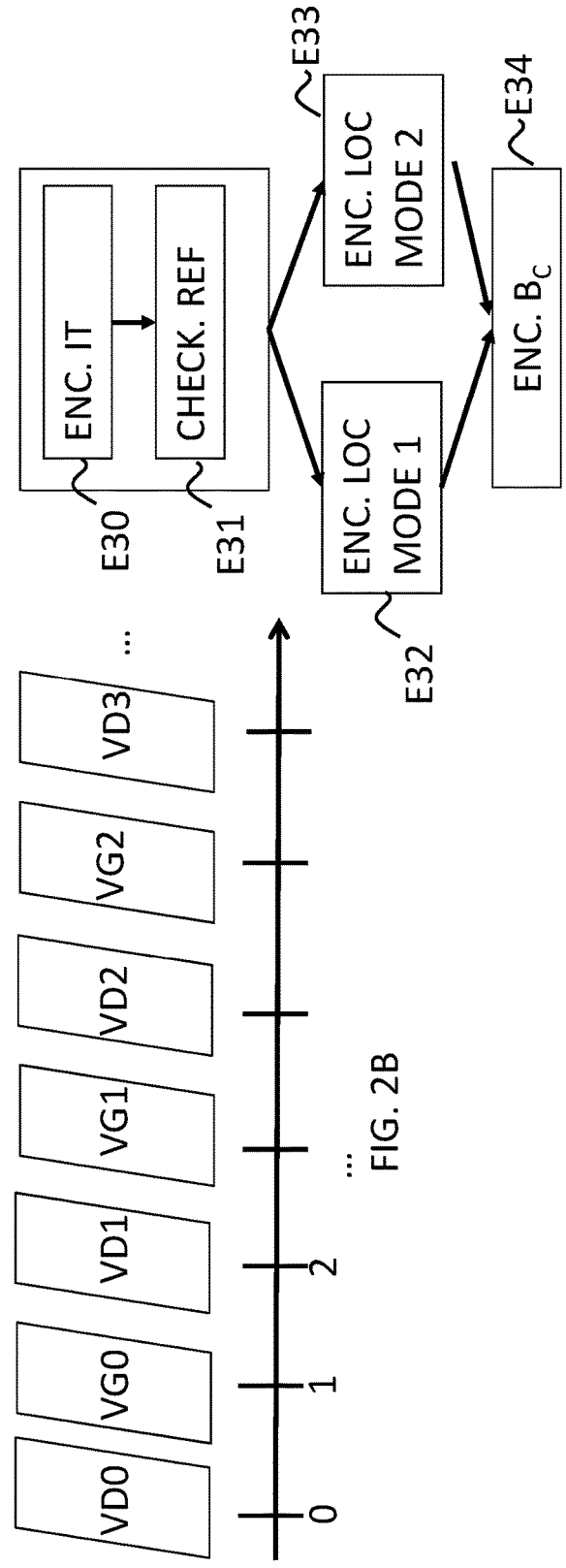
FIG. 2B
FIG. 3A

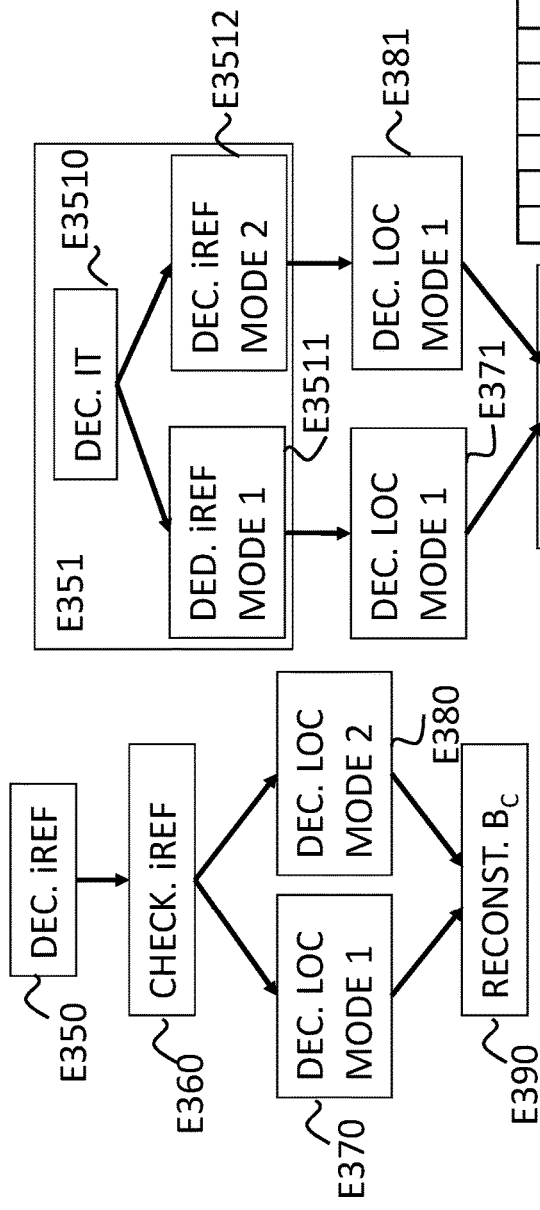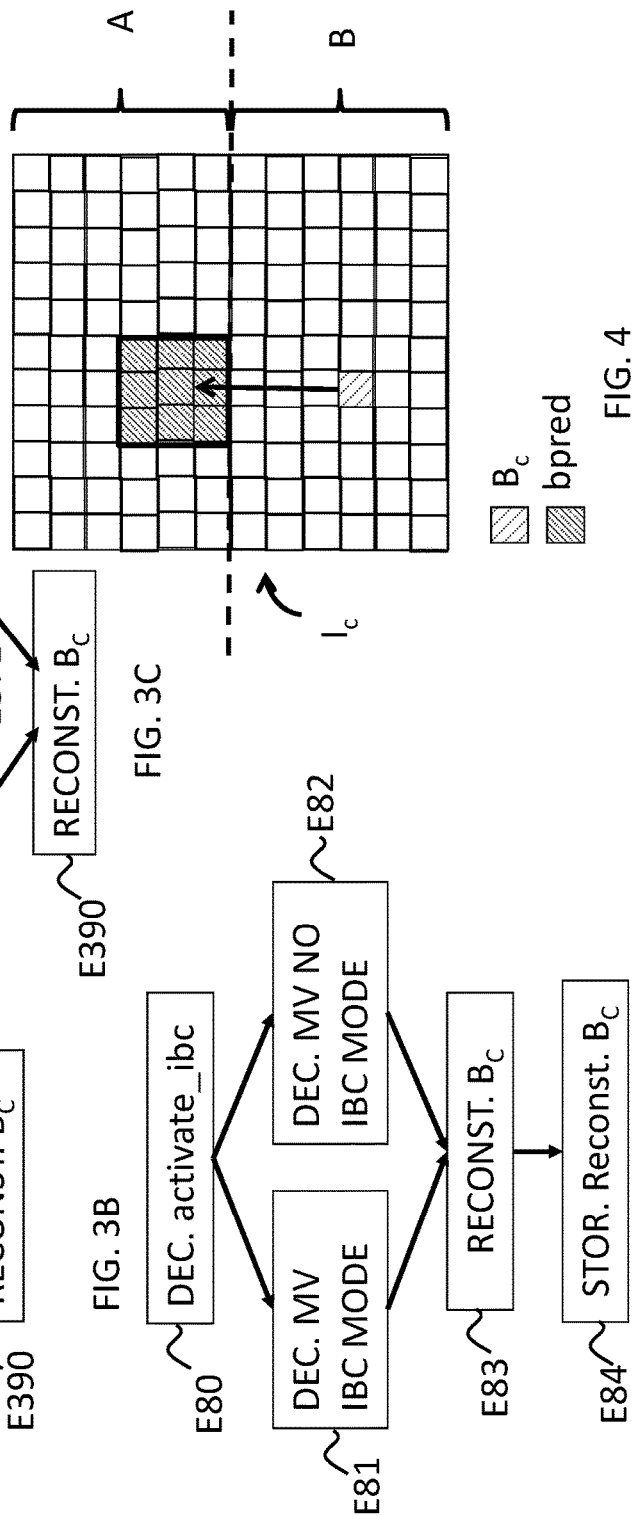

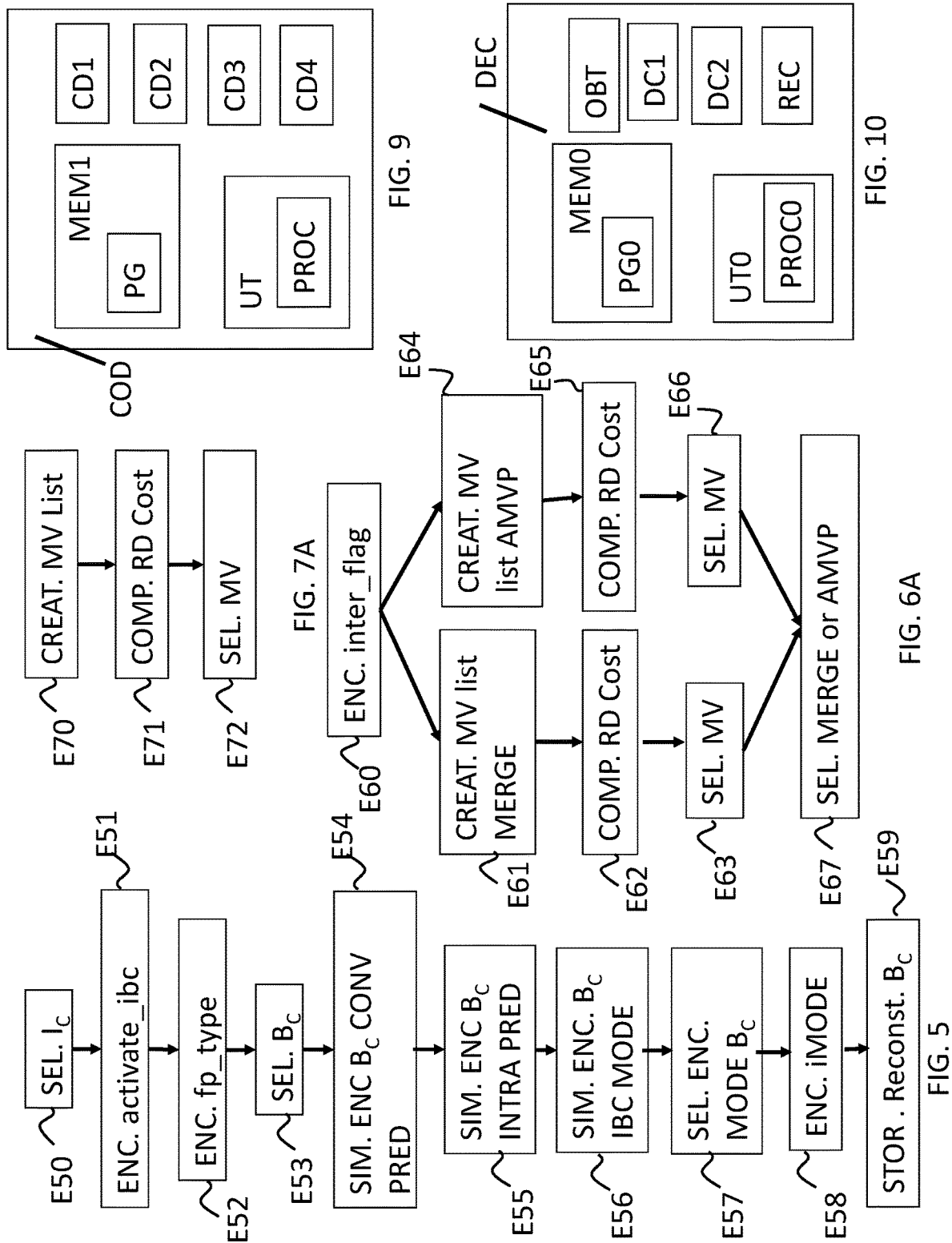

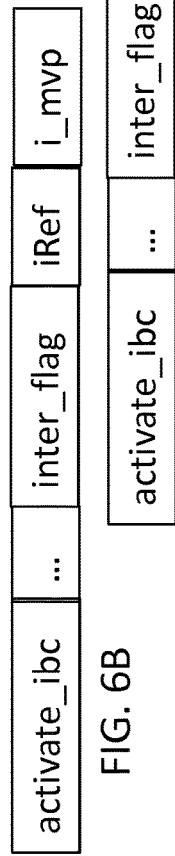
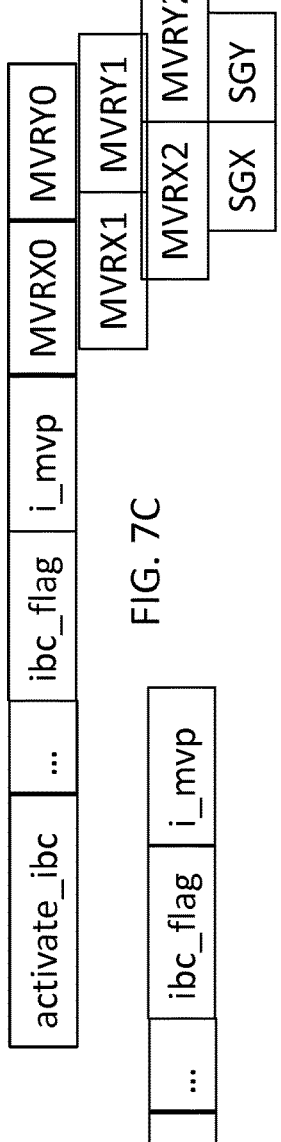
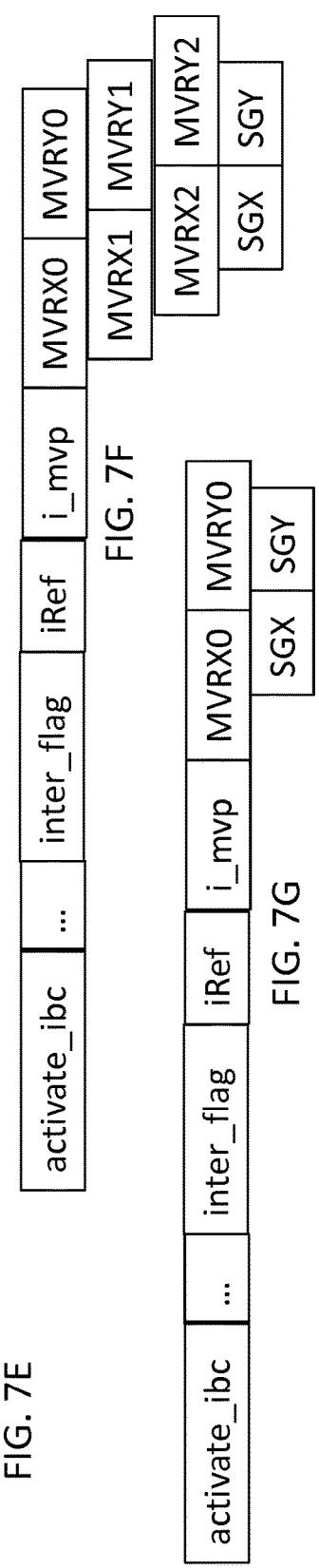

METHODS AND DEVICES FOR ENCODING AND DECODING A DATA STREAM REPRESENTATIVE OF AN IMAGE SEQUENCE

CROSS-REFERENCE TO RELATED APPLICATIONS

This Application is a Section 371 National Stage Application of International Application No. PCT/FR2018/051,581, filed Jun. 28, 2018, which is incorporated by reference in its entirety and published as WO 2019/008,255 A2 on Jan. 10, 2019, not in English.

1. FIELD OF THE INVENTION

The field of the invention is that of encoding and decoding image sequences, and in particular video streams.

More specifically, the invention relates to the compression of image sequences by dividing images into blocks.

The invention can in particular be applied to the video coding tasks implemented in current or future encoders (JPEG, MPEG, H.264, HEVC, etc. and amendments made thereto), as well as to corresponding decoding tasks.

2. PRIOR ART

Digital image sequences occupy a large amount of space in terms of memory, which requires, when these images are transmitted, the compression thereof so as to prevent congestion problems from occurring over the network used for this transmission. More specifically, the bandwidth that can be used over this network is generally limited.

Numerous techniques for compressing video data are already known. These include the HEVC compression standard ("High Efficiency Video Coding, Coding Tools and Specification", Matthias Wien, Signals and Communication Technology, 2015), which proposes predicting pixels of a current image from other pixels belonging to the same image (intra-prediction) or to a previous or later image (inter-prediction).

More specifically, intra-prediction exploits the spatial redundancies within an image. With this in mind, the images are divided into blocks of pixels. The blocks of pixels are then predicted using information that has already been reconstructed, corresponding to previously encoded/decoded blocks in the current image according to the order in which the blocks in the image are scanned.

Moreover, in a conventional manner and as shown in FIG. 1A, the encoding of a current block $B_c$ is carried out by way of a prediction (P) of the current block supplying a predictor block pred and a prediction residue res or "residual block", corresponding to a difference between the current block $B_c$ and the predictor block pred. The residual block res obtained is then transformed (T), for example using a transform of the DCT (Discrete Cosine Transform) type. The coefficients of the transformed residual block are then quantised (Q), and encoded in a data stream Flx by entropy coding (C) and transmitted to the decoder, which can reconstruct the current block $B_{rec}$ by adding this residual block res to the predictor block pred. In a known manner, the current block is also reconstructed at the encoder ($B_{rec}$) so as to be used to predict other blocks in the image sequence.

Decoding, for example as shown in FIG. 1B, is carried out on an image by image basis, and for each image, on a block by block basis. For each block to be reconstructed, the elements corresponding to the block are decoded (D) from the data stream Flx. Inverse quantisation ($Q^{-1}$) and inverse transform ($T^{-1}$) of the coefficients of the residual block $res_{rec}$ are carried out. Then, the prediction of the block is computed (P) in order to obtain the predictor block pred and the current block is reconstructed ($B_{rec}$) by adding the prediction (i.e. the predictor block) to the decoded residual block $res_{rec}$.

In a conventional manner, for the inter-image prediction of a current block $B_c$, a predictor block pred is sought in a reference image $I_{ref}$ corresponding to a previously encoded and reconstructed image in the image sequence. When encoding/decoding a current image, a plurality of reference images can be available in memory (MEM) at the encoder and at the decoder. In order for the decoder and the encoder to use the same reference image $I_{ref}$ to obtain the predictor block pred of the current block, a syntax element identifying the reference image used to predict the current block is encoded in the data stream Flx representative of the image sequence. Similarly, in order to identify the predictor block in the reference image, one or more syntax elements are encoded in the data stream Flx representative of the image sequence. In a conventional manner, these syntax elements identifying the predictor block in the reference image $I_{ref}$ correspond to a motion vector my indicating the location of the predictor block pred in the reference image $I_{ref}$ relative to the location of the current block $B_c$ in the current image.

Video coding as described hereinabove is known to be used to encode specific image sequences such as multiview image sequences. For this purpose, a technique known as "Frame Packing" consists, for example, of packing all views of a time instant into a single image, and of transmitting the images comprising the packed views to a conventional 2D video encoder.

FIG. 2A shows example arrangements of views of an image of a multiview sequence. For example, the image (a) shows an arrangement of two views V1, V2, one above the other, image (b) shows an arrangement of two views V1, V2, side-by-side, and image (c) shows an arrangement of four views V1, V2, V3, V4 according to a left-right, top-bottom scan. Other view arrangements are possible and are not limited to two or four views.

According to the HEVC standard, a "frame_packing_arrangement_type" syntax element is encoded in the data stream of the image sequence. This syntax element enables the type of frame packing carried out in a current image to be indicated. In other words, this syntax element indicates the manner in which the views are arranged in the current image. For example, the value 4 indicates a "top-bottom" arrangement, specifying that the views are arranged one below the other. However, the arrangement of the views in the current image is not used by a HEVC encoder.

Another technique, which is more specific to stereoscopic video sequences, i.e. video sequences comprising two views per time instant: one view for the left eye (VG) and one view for the right eye (VD), consists of interlacing the left- and right-hand views of each time instant to obtain the image sequence VD(0), VG(0), VD(1), VG(1), VD(2), VG(2), Such an example is shown in FIG. 2B. The image sequence with the interlaced views is then transmitted to a conventional 2D video encoder.

The drawback of the techniques presented hereinabove lies in the fact that each view in a multiview sequence is encoded without exploiting the inter-view correlations that exist between the views of a same time instant. 2D video encoders are not modified, and the encoding modes available for encoding images in an image sequence derived from frame packing or for encoding interlaced images are identical to those used for a monoview 2D image sequence.

There is thus a need for a new technique for encoding a current block, enabling the compression of the video data of a multiview image sequence to be improved.

3. DESCRIPTION OF THE INVENTION

The invention improves upon the prior art. To this end, it relates to a method for decoding a data stream representative of an image sequence, wherein at least one current block of a current image in the image sequence is encoded using a predictor block of a reference image, said predictor block being identified in the reference image via location information.

Advantageously, such a decoding method comprises the steps of:
- obtaining an information item enabling the reference image to be identified from a set of reference images,
- when the reference image satisfies a predetermined criterion, decoding the location information using a first decoding mode,
- otherwise, decoding the location information using a second decoding mode, the first and second decoding modes comprising at least one different decoding parameter,
- reconstructing the current block from the predictor block.

According to the invention, a decoding mode can thus be obtained, and consequently an encoding mode, for a location information item of a predictor block that is different depending on the reference image used.

Thus, for example, depending on the reference image used to predict the current block, the encoding modes available for encoding the location information associated with the predictor block vary. For example, certain encoding modes may not be permitted as a result of the reference image. Thus, depending on the reference image, the syntax required for signalling the location information for the predictor block in the reference image can be simplified relative to conventional encoding of a motion vector.

For example, the second decoding mode corresponds to conventional decoding of an existing standard, such as the HEVC standard, and the first decoding mode corresponds to a new decoding mode adapted to the specificity of the reference image.

According to the invention, a decoding parameter of a decoding mode can correspond, in a non-limiting manner, to one or more syntax elements used to signal the decoding mode, or a manner of creating a list of predictors of motion vectors in order to decode a motion vector of the predictor block, or an entropy coding context used to encode a syntax element of the decoding mode, or even an initialisation probability of an entropy coding context, etc.

Advantageously, the decoding method according to the invention applies both to the decoding of multiview image sequences and to the decoding of monoview image sequences.

According to one specific embodiment of the invention, obtaining an information item enabling the reference image to be identified from a set of reference images comprises the decoding of an identifier of the reference image. Thus, the identification of the reference image is carried out before the decoding of the location information, by the decoding of an identifier of the reference image. In such a case, use of the first decoding mode or of the second decoding mode is determined as a function of the reference image identified.

According to one specific embodiment of the invention, obtaining an information item enabling the reference image to be identified from a set of reference images comprises:

- decoding an information item indicating whether the location information must be decoded using the first decoding mode or using the second decoding mode,
- when the location information must be decoded using the first decoding mode, identifying the reference image by deducing the use of the first decoding mode,
- when the location information must be decoded using the second decoding mode, identifying the reference image by decoding, from the data stream, an identifier of the reference image.

According to this specific embodiment of the invention, the identification of the reference image is carried out by deducing the use of the first decoding mode. According to this alternative, when the first decoding mode is used, an identifier of the reference image does not need to be transmitted in the data stream. Transmission of a syntax element identifying the decoding mode of the location information is sufficient.

According to one specific embodiment of the invention, the location information can be a motion vector or coordinates of the predictor block in the reference image.

According to another specific embodiment of the invention, the image sequence is representative of a multiview video, an image in the image sequence comprising an arrangement of the views of a time instant of the multiview video, and wherein the reference image satisfies the predetermined criterion when the reference image corresponds to the current image. According to this specific embodiment of the invention, the decoding of the location information of a predictor block is adapted depending on whether the reference image for the current block is the current image, i.e. the image currently being decoded, or a conventional reference image.

According to another alternative to this other specific embodiment of the invention, the current block belongs to a first region of the current image corresponding to a first view of a time instant, and the predictor block belongs to a second region of the current image corresponding to a second view of the time instant that is different from the first view, said second region corresponding to a region of the current image previously reconstructed. This alternative takes advantage of the interview correlations of a time instant using a predictor block located in a part of the current image already reconstructed.

According to another specific embodiment of the invention, the image sequence is representative of a stereoscopic video comprising, at each time instant, a left-hand view and a right-hand view, the images in the image sequence alternately corresponding to a left-hand view or a right-hand view of the stereoscopic video, and wherein the reference image satisfies the predetermined criterion when the reference image corresponds to a view of the same time instant as the current image or when the reference image corresponds to the same view as the current image. According to this specific embodiment of the invention, and according to a first alternative, use of the first decoding mode of the location information of a predictor block is dependent on whether the reference image for the current block is the complementary view of the view corresponding to the current image. More specifically, if the current image corresponds to a left-hand view, or respectively to a right-hand view, of a time instant, the criterion is satisfied if the reference image corresponds to the right-hand view, or respectively to the left-hand view, of the same time instant.

According to another alternative to this specific embodiment of the invention, use of the first decoding mode of the location information of a predictor block is dependent on whether the reference image for the current block corresponds to the same view as the current image.

More specifically, if the current image corresponds to a left-hand view, or respectively to a right-hand view, of a time instant, the criterion is satisfied if the reference image corresponds to a left-hand view, or respectively to a right-hand view, of another time instant.

According to another specific embodiment of the invention, the reference image satisfies the predetermined criterion when a type of the reference image corresponds to a predetermined type. According to this specific embodiment of the invention, the decoding of the location information of a predictor block is adapted to the type of the reference image. For example, according to the HEVC standard, the reference images are classed according to two types: so-called short-term images and so-called long-term images. Short-term reference images are identified by an index representative of a time offset relative to the current image. Long-term reference images are identified by the number thereof in the image sequence. This specific embodiment enables the encoding of a motion vector to be adapted to the type of the reference image. For example, a new encoding mode of the motion vector is used for the reference images of the "long-term" type and the conventional encoding mode of the HEVC standard is used for the reference images of the "short-term" type.

According to another specific embodiment of the invention, the location information corresponds to a motion vector, and the first decoding mode creates a list of motion vectors comprising at least one of the following motion vectors:
  a motion vector pointing to a first block of the reference image spatially co-located with the current block of the current image,
  a motion vector pointing to a block of the reference image located above the first block,
  a motion vector pointing to a block of the reference image located to the left of the first block,
  a motion vector pointing to a block of the reference image located above and to the left of the first block,
  a motion vector pointing to a block of the reference image located to the right of the first block,
  a motion vector pointing to a block of the reference image located above and to the right of the first block,
  a motion vector pointing to a block of the reference image located below the first block,
  a motion vector pointing to a block of the reference image located below and to the right of the first block,
  a motion vector pointing to a block of the reference image located below and to the left of the first block.

According to this specific embodiment of the invention, the motion vector enabling the predictor block to be identified is encoded relative to a list of motion vectors pointing to an area of blocks of the reference image centred on a block of the reference image that is co-located with the current block.

According to an alternative to this specific embodiment of the invention, the list only comprises a single motion vector for the predictor block, and this motion vector is a motion vector that identifies a block of the reference image that is spatially co-located with the current block. According to this embodiment, when the reference image is not the current image, such a motion vector corresponds to a zero vector. When the reference image corresponds to the current image, such a motion vector corresponds to a displacement within the current image pointing to the same location in the view of the current image used as a reference for the current block, as the current block in the view being decoded/encoded.

According to another specific embodiment of the invention, decoding using the first decoding mode comprises the steps of:
  creating a list of motion vectors,
  decoding, from the data stream, an index identifying the motion vector from the motion vectors within the list to be used to identify the predictor block,
  decoding, from the data stream, an information item indicating whether a horizontal component, or respectively a vertical component, of the identified motion vector, is equal to zero,
  when the horizontal component, or respectively the vertical component, of the identified motion vector is different from zero, allocating a value equal to 1 to the horizontal, or respectively to the vertical component.

This specific embodiment of the invention enables part of the syntax of an AMVP (Advanced Motion Vector Prediction) decoding mode of the HEVC standard to be re-used.

According to another specific embodiment of the invention, decoding using the first decoding mode and decoding using the second decoding mode both use the same syntax elements to signal the motion vector to be used to identify the predictor block, the first decoding mode and the second decoding mode using different entropy decoding types or when the first decoding mode and the second decoding mode use the same entropy decoding type, whereby the same entropy decoding type uses context-based decoding, the first decoding mode and the second decoding mode use different decoding contexts.

According to another alternative, this specific embodiment of the invention enables the syntax of the existing standard decoding modes to be re-used, while adapting the type of entropy decoding. The term entropy decoding is understood herein to mean the decoding of a sequence of binary data enabling symbols to be provided at the output, which symbols represent the value of the syntax elements allowing the image sequence to be reconstructed.

According to another alternative, this specific embodiment of the invention enables the entropy decoding contexts, and thus the entropy coding contexts, to be adapted to the reference image.

The invention further relates to a method for encoding a data stream representative of an image sequence, comprising, for at least one current block of a current image in the image sequence, the steps of:
  encoding an information item enabling, when decoding the current block, an information item to be obtained, which information item enables a reference image to be identified from a set of reference images,
  when the reference image satisfies a predetermined criterion, encoding using a first encoding mode, a location information item of a predictor block of the reference image used to predict the current block,
  when the reference image does not satisfy the predetermined criterion, encoding using a second encoding mode, location information, whereby the first and second encoding modes comprise at least one different encoding parameter,
  encoding the current block at least from the predictor block.

The features and advantages of this encoding method are the same as those of the decoding method, and are not described in more detail here. The encoding method can be implemented in a corresponding manner, according to any one of the specific embodiments described with reference to the decoding method hereinabove.

The invention further relates to a decoding device configured to implement the decoding method according to any one of the specific embodiments defined hereinabove. It goes without saying that this decoding device can have the different features provided relative to the decoding method according to the invention. Thus, the features and advantages of this decoding device are the same as those of the decoding method, and are not described in more detail here.

According to one specific embodiment of the invention, such a decoding device is comprised within a terminal.

The invention further relates to an encoding device configured to implement the encoding method according to any one of the specific embodiments defined hereinabove. It goes without saying that this encoding device can have the different features provided relative to the encoding method according to the invention. Thus, the features and advantages of this encoding device are the same as those of the encoding method, and are not described in more detail here.

According to one specific embodiment of the invention, such an encoding device is comprised within a terminal or a server.

The decoding method, and respectively the encoding method, according to the invention can be implemented in various manners, in particular in a wired form or in a software form.

According to one specific embodiment of the invention, the decoding method, and respectively the encoding method, is implemented by a computer program. The invention further relates to a computer program including instructions for implementing the decoding method or the encoding method according to any one of the specific embodiments described hereinabove, when said program is executed by a processor. Such a program can use any programming language whatsoever. It can be downloaded from a communication network and/or saved on a computer-readable medium.

This program can use any programming language and be in the form of a source code, object code, or intermediate code between a source code and an object code, such as a partially compiled form, or in any other desired form.

The invention further relates to a recording medium or computer-readable information medium, and including instructions of a computer program as stipulated hereinabove. The recording media stipulated hereinabove can be any entity or device capable of storing the program. For example, the medium can comprise a storage means, such as a ROM, for example a CD-ROM or a microelectronic circuit ROM, or even a magnetic recording means, for example a floppy disc or a hard drive. On the other hand, the recording media can correspond to a transmittable medium such as an electric or optical signal, which can be carried via an electric or optical cable, by radio, or by other means. The program according to the invention can in particular be downloaded from an Internet-type network.

Alternatively, the recording media can correspond to an integrated circuit into which the program is incorporated, the circuit being suitable for executing or for use in the execution of the method in question.

The invention further relates to a signal including encoded data representative of an image sequence, comprising, for at least one current block of an image in the image sequence, encoded data of the current block, said current block being encoded by prediction from a predictor block of a reference image, said predictor block being identified in the reference image by a location information item.

According to one specific embodiment of the invention, such a signal further comprises an activation information item associated with a group of blocks of the image or of the image sequence, said current block belonging to said group of blocks, said activation information indicating:
that a first decoding mode can be used to decode the location information of the predictor block, when the reference image satisfies a predetermined criterion, and
when the reference image does not satisfy the predetermined criterion, that a second decoding mode is used to decode the location information, whereby the first and second decoding modes comprise at least one different decoding parameter.

According to another specific embodiment of the invention, such a signal further comprises a use information item indicating whether a first decoding mode must be used to decode the location information of the predictor block, when the reference image satisfies a predetermined criterion, or whether a second decoding mode must be used to decode the location information of the predictor block when the reference image does not satisfy the predetermined criterion, whereby the first and second decoding modes comprise at least one different decoding parameter.

According to another specific embodiment of the invention, the signal comprises said activation information described hereinabove and said use information described hereinabove.

4. LIST OF FIGURES

Other features and advantages of the invention will be better understood upon reading the following description of a plurality of specific embodiments, provided as simple non-limiting examples for illustration purposes, and with reference to the accompanying figures, in which:

FIGS. 1A and 1B respectively show steps of a video encoding and decoding method according to the prior art, FIG. 2A shows examples of arranging views of the same time instant of a multiview video sequence in an image of an image sequence, FIG. 2B shows an example of the interlacing of views of a stereoscopic video in order to form an image sequence, FIG. 3A shows steps of the method for encoding an image sequence according to one specific embodiment of the invention, FIGS. 3B and 3C show alternatives to the method for decoding an image sequence according to one specific embodiment of the invention, FIG. 4 shows a specific arrangement of two views of a multiview sequence in an image of an image sequence, FIG. 5 shows steps of the method for encoding an image sequence according to another specific embodiment of the invention, FIG. 6A shows steps for encoding a motion vector according to encoding modes of the prior art, FIGS. 6B and 6C show data streams obtained by encoding a motion vector using one of the encoding modes described in FIG. 6A, FIG. 7A shows steps for encoding a motion vector according to one specific embodiment of the invention, FIG. 7B-G show data streams obtained by encoding a motion vector according to one of the alternatives described in FIG. 7A, FIG. 8 shows steps of the method for decoding an image sequence according to another specific embodiment of the invention, FIG. 9 shows a device for encoding an image sequence according to a specific embodiment of the invention, FIG. 10 shows a device for decoding an image sequence according to a specific embodiment of the invention.

5. DESCRIPTION OF SPECIFIC EMBODIMENTS OF THE INVENTION

5.1 General Principle

The general principle of the invention is to adapt the encoding and decoding of a motion vector used to predict a current block of an image depending on the reference image used to predict the current block. The invention thus enables the performance levels for compressing a conventional video encoder to be improved.

5.2 Implementation Examples

5.2.1 Method for Encoding an Image Sequence According to a Specific Embodiment of the Invention A method is described with reference to FIG. 3A for encoding a data stream representative of an image sequence according to one specific embodiment of the invention. The method is described herein for a current block of pixels of a current image to be encoded in the image sequence.

In a step E30, an information item enabling, when decoding the current block, an information item to be obtained, which latter information item enables a reference image to be identified from a set of reference images, is encoded in the data stream. Such a reference image is used to predict the current block using a location information item enabling a predictor block of the current block to be identified in the reference image.

According to an alternative, such an encoded information item can correspond to an identifier of the reference image, for example, an index of a reference image from among the list of reference images stored in memory in the encoder.

According to this alternative, in a step E31, it is checked whether the reference image satisfies a predetermined criterion.

According to a sub-alternative, the image sequence is representative of a multiview video, and an image in the image sequence comprises an arrangement of the views of a time instant of the multiview video. According to this sub-alternative, the reference image satisfies the predetermined criterion when the reference image corresponds to the current image, i.e. if the reference image index is, for example, equal to 0, when the reference images are identified by the time offset relative to the current image.

According to another sub-alternative, the image sequence is representative of a stereoscopic video. Conventionally, a stereoscopic video comprises two views at each time instant: one view for the left eye (left-hand view) and one view for the right eye (right-hand view). The images in the image sequence alternately correspond to a left-hand view or to a right-hand view of the stereoscopic video, i.e. the left-hand and right-hand views are temporally interlaced, as shown in FIG. 2B. According to this sub-alternative, the reference image satisfies the predetermined criterion when the reference image corresponds to a view of the same time instant as the current image.

Alternatively, the reference image satisfies the predetermined criterion when the reference image corresponds to the same view as the current image.

According to another sub-alternative, the image sequence is representative of a conventional 2D video. The reference image satisfies the predetermined criterion when the type of the reference image corresponds to a predetermined type, for example when the reference image is an image of the long-term reference picture type according to the HEVC standard.

According to another alternative, such an encoded information item can correspond to an indicator indicating whether the location information of the predictor block must be encoded using a first encoding mode or using a second encoding mode. According to this alternative, when the location information must be encoded using the first encoding mode, the reference image is identified by deducing the use of the first encoding mode, i.e. that no index of the reference image must be encoded when the first encoding mode is used. When the location information must be encoded using the second encoding mode, an index identifying the reference image must be encoded in the data stream.

It should be noted that according to this other alternative, the step E31 is not carried out.

More specifically, when the image sequence is representative of a multiview video, and when an image in the image sequence comprises an arrangement of the views of a time instant of the multiview video, according to this alternative, when the index of the reference image is not encoded, it is allocated a value of 0 and the reference image thus corresponds to the current image.

When the image sequence is representative of a stereoscopic video comprising, at each time instant, a left-hand view and a right-hand view, and when the images in the image sequence alternatively correspond to a left-hand view or a right-hand view of the stereoscopic video, and when the index of the reference image is not encoded, the reference image corresponds to the view of the same time instant as the current image.

When the image sequence is representative of a conventional 2D video, and when the index of the reference image is not encoded, then the reference image corresponds to the first image in the list of reference images of the predetermined type, for example the first image of the long-term reference picture type according to the HEVC standard.

When the reference image satisfies the predetermined criterion, the location information of the predictor block is encoded using the first encoding mode in the step E32.

When the reference image does not satisfy the predetermined criterion, the location information of the predictor block is encoded using the second encoding mode in a step E33.

The first and second encoding modes comprise at least one different encoding parameter.

For example, an encoding parameter of an encoding mode can correspond, in a non-limiting manner, to one or more syntax elements used to signal the encoding mode, or a manner of creating a list of predictors of motion vectors in order to decode a motion vector of the predictor block, or an entropy coding context used to encode a syntax element of the decoding mode, or even an initialisation probability of an entropy coding context.

In a step E34, the current block is encoded in a conventional manner from the predictor block, by transformation and quantisation of the prediction residue and entropy coding of the coefficients transformed and quantised. Conventionally, the current block is reconstructed in order to be stored in memory.

5.2.2 Method for Decoding an Image Sequence According to a Specific Embodiment of the Invention A method is described with reference to FIG. 3B for decoding a data stream representative of an image sequence according to an alternative to a specific embodiment of the invention.

The method is described herein for a current block of a current image to be decoded in the image sequence. The current block is encoded in the data stream using a predictor block of a reference image. The predictor block is identified in the reference image by a location information item.

In a step E350, an information item enabling the reference image to be identified from a set of reference images is obtained.

According to this alternative, the step E350 corresponds to the decoding of an identifier iRef of the reference image.

In a step E360, it is determined whether the reference image satisfies a predetermined criterion.

When the image sequence is representative of a multiview video with an arrangement of the views in an image, the reference image satisfies the predetermined criterion when the identifier of the reference image is equal to 0 (when the reference images are identified by the time offset relative to the current image), i.e. when the identifier of the reference image indicates that the reference image is the current image.

When the image sequence is representative of a stereoscopic video, and when the views are interlaced in the image sequence, the reference image satisfies the predetermined criterion when the identifier of the reference image indicates that the reference image corresponds to a view of the same time instant as the current image. This verification can be implemented by a computation, from the respective indices of the current image POC1, (POC being the abbreviation of "Picture Order Count", known in the video compression standards of the ITU), and of the reference image POC2, POC2 being obtained from the identifier of the reference image iRef. An interlacing for example, is assumed, as shown in FIG. 2B, and the following are thus checked:
- if POC1 is even (the current image is a right-hand view in the example in FIG. 2B), and if POC2=POC1+1, (the reference image is the corresponding left-hand view in the example in FIG. 2B), the reference image satisfies the predetermined criterion,
- if POC1 is odd (the current image is a left-hand view in the example in FIG. 2B), and if POC2=POC1−1 (the reference image is the corresponding right-hand view in the example in FIG. 2B), the reference image satisfies the predetermined criterion,
- otherwise the reference image does not satisfy the predetermined criterion.

When the image sequence is representative of a conventional 2D video, the reference image satisfies the predetermined criterion when the type of the reference image corresponds to a predetermined type, for example when the reference image is an image of the long-term reference picture type according to the HEVC standard.

When the reference image satisfies the predetermined criterion, the location information is decoded using a first decoding mode in a step E370.

When the reference image does not satisfy the predetermined criterion, the location information is decoded using a second decoding mode in a step E380.

Similarly to the encoding method described hereinabove, the first and second decoding modes comprise at least one different decoding parameter.

In a step E390, the current block is reconstructed, in a conventional manner, from the predictor block, and from the decoded, de-quantised and inversely-transformed coefficients.

A method is described with reference to FIG. 3C for decoding a data stream representative of an image sequence according to another alternative to the specific embodiment of the invention. The method is described herein for a current block of a current image to be decoded in the image sequence. The current block is encoded in the data stream using a predictor block of a reference image. The predictor block is identified in the reference image by a location information item.

In a step E351, an information item enabling the reference image to be identified from a set of reference images is obtained.

According to this alternative, the step E351 comprises, in a step E3510, decoding an information item indicating whether the location information must be decoded using the first decoding mode or using the second decoding mode.

When the location information must be decoded using the first decoding mode, in a step E3511, the reference image is identified by deducing the use of the first decoding mode.

When the image sequence is representative of a multiview video with an arrangement of the views in an image, the reference image is the current image.

When the image sequence is representative of a stereoscopic video, and when the views are interlaced in the image sequence, an interlacing, for example, as shown in FIG. 2B is assumed, and thus if the index of the current image is POC1, the number of the reference image is POC2, POC2 being obtained by:
- if POC1 is even (the current image is a right-hand view in the example in FIG. 2B), then POC2=POC1+1, (the reference image is the corresponding left-hand view in the example in FIG. 2B),
- if POC1 is odd (the current image is a left-hand view in the example in FIG. 2B), then POC2=POC1−1 (the reference image is the corresponding right-hand view in the example in FIG. 2B).

The identifier iRef of the reference image among the images previously reconstructed and stored in memory is obtained from POC2 that was previously computed.

When the image sequence is representative of a conventional 2D video, the reference image is identified as a reference image of a predetermined type, for example an image of the long-term type according to the HEVC standard.

Then, in a step E371, the location information is decoded using the first decoding mode.

When the location information must be decoded using the second decoding mode, in a step E3512, the reference image is identified by decoding, from the data stream, an identifier of the reference image.

In a step E381, the location information is decoded using a second decoding mode.

Similarly to the encoding method described hereinabove, the first and second decoding modes comprise at least one different decoding parameter.

In a step E390, the current block is reconstructed, in a conventional manner, from the predictor block, and from the decoded, de-quantised and inversely-transformed coefficients.

5.2.3 Method for Encoding an Image Sequence According to Another Specific Embodiment of the Invention The method is described with reference to FIG. 5 for encoding an image sequence of an encoded data stream according to one specific embodiment of the invention, wherein each image in the image sequence comprises the views of an image of a multiview video sequence arranged according to the frame packing technique described hereinabove. The example described here considers a "top-bottom" arrangement and a multiview sequence comprising two views, such an example being shown in FIG. 2A (a) and FIG. 4. It goes without saying that the encoding method applies to other types of arrangements and to a number of views that exceeds 2.

In a step E50, a current image $I_c$ of the video to be encoded is selected. At least one image of the video is considered to have been previously encoded, in a known manner, for example by intra-image spatial encoding. This previously encoded image has been reconstructed and stored in memory.

In a known manner, the image to be encoded $I_c$ is divided into a set of blocks of pixels to be encoded. These blocks can have a fixed or variable size, can be square or rectangular, or of a random shape depending on the encoder used.

According to one specific embodiment of the invention, in a step E51, an indicator indicating whether or not intra block copy is activated, is encoded in the data stream. This is a binary indicator. This indicator can be encoded at each image of the video, or only once for a group of images of the video, or only once for the entire video. This is referred to here as activate_ibc.

According to one specific embodiment of the invention, the indicator activate_ibc is not encoded and intra block copy is activated by default.

Intra block copy is a prediction method enabling the encoding of a current block of an image to be encoded using a predictor block identified by a motion vector pointing to a reference region of the current image. The reference image for predicting the current block is thus, in such a case, the current image. It should be noted that only the region of the current image including previously encoded and reconstructed blocks can be used.

According to one specific embodiment of the invention, in a step E52, an indicator fp_type indicating the type of frame packing is also encoded in the data stream.

According to one specific embodiment of the invention, as shown in FIG. 4, the current image $I_c$ is divided into two regions A and B, each region corresponding to a view of the same time instant. Region A is considered herein to have been previously encoded and reconstructed, for example by conventional intra- or inter-image encoding.

In a step E53, a current block $B_c$ to be encoded is selected in the part B of the image $I_c$.

The encoder will simulate the encoding of the block $B_c$ in order to select the best encoding mode for this block.

In a step E54, the encoder simulates the encoding of the block $B_c$ using conventional prediction techniques, for example those used in the HEVC standard (G. J. Sullivan; J. R. Ohm; W. J. Han; T. Wiegand (December 2012). "Overview of the High Efficiency Video Coding (HEVC) Standard" (PDF). IEEE Transactions on Circuits and Systems for Video Technology. IEEE. 22 (12)).

Thus, for example, the encoder simulates the encoding of the current block $B_c$ by inter-image prediction. This approach is known by a person skilled in the art and is described with reference to FIG. 6A. This approach consists of predicting the current block $B_c$ using a block constructed from pixels derived from previously encoded images stored in memory, also referred to as reference images. In such a case, in a conventional manner, a motion vector and an index indicating the reference image used to predict the block are encoded in the stream.

Then, a residue is formed between the predictor block and the original block, and this residue is transformed, quantised and encoded.

FIG. 6A shows in more detail the encoding of the motion vector in the prior art. In the prior art of HEVC, the motion vector can be encoded using two different modes: the MERGE mode and the AMVP mode (Advanced Motion Vector Prediction).

FIGS. 6B and 6C show examples of data streams encoding the motion vector obtained respectively by the MERGE mode and by the AMVP mode as described hereafter.

Figure 1A:
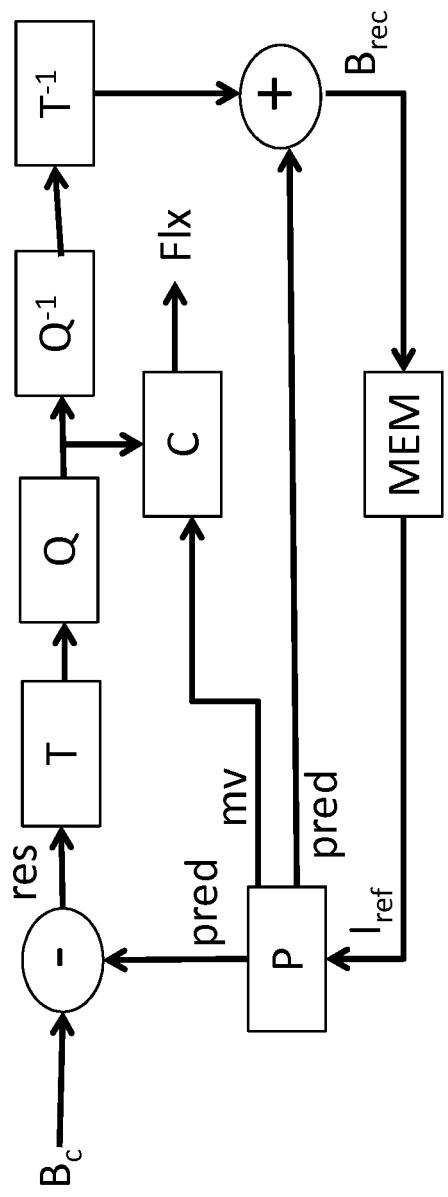

In a step E60, a binary syntax element (for example the "inter flag" indicator shown in FIG. 6B or 6C) is encoded in order to inform the decoder which of the MERGE mode or AMVP mode is used.

In the MERGE mode, in a step E61, a list of motion vectors is created. The motion vectors in the list are motion vectors having been used to encode neighbouring blocks of the current block (block situated to the left, blocks situated above the current block, block co-located in the previous image). The manner in which this list is populated is known for the HEVC standard.

In a step E62, the encoder will use a criterion (for example the rate-distortion cost) to select the motion vector from the list that will be used to predict the current block. In the step E62, for each motion vector in the list, the encoder computes the rate-distortion cost associated with this motion vector by carrying out the steps of predicting, encoding and reconstructing the current block $B_c$ with this motion vector, and by encoding an index (i_mvp in FIG. 6B) to indicate the motion vector in the list, and an index indicating the reference image used (iRef in FIG. 6B).

In a step E63, the motion vector in the list that supplies the best criterion, in terms of rate/distortion, is selected for the MERGE encoding mode.

In the AMVP mode, in a step E64, a new list of predictors is created, including, in the same manner as with the MERGE mode, a set of motion vectors having been used to encode the blocks adjacent to the current block $B_c$. However, in the AMVP mode, the list is different from the list of the MERGE mode. The manner in which this list is populated is known for the HEVC standard.

In the same manner as with the MERGE mode, in a step E65, for each motion vector in the AMVP list, the encoder computes the rate-distortion costs associated with each motion vector. In the AMVP mode, an index (i_mvp in FIG. 6C) is encoded in order to indicate the motion vector MVA selected and an index indicating the reference image used (iRef in FIG. 6C). A motion vector residue MVR is then encoded. The horizontal component MVRx and vertical component MVRy of the residue MVR are encoded independently. The following information is encoded for each of these components:

- a syntax element indicating whether or not the component is equal to zero (MVRX0, MVRY0 in FIG. 6C),
- where appropriate, a syntax element indicating whether or not the component is equal to one (MVRX1, MVRY1 in FIG. 6C), where appropriate, a syntax element indicating the amplitude of the component reduced by 2 (MVRX2, MVRY2 in FIG. 6C), where appropriate, a syntax element indicating the sign of the component (SGX, SGY in FIG. 6C).

Thus, the motion vector MVA used to encode the current block using the AMVP mode is given by MVP+MVR.

In a step E66, the motion vector in the list that supplies the best criterion, in terms of rate/distortion, is selected for the AMVP encoding mode.

In a step E67, the encoder selects the MERGE or AMVP encoding mode that supplies the best rate/distortion criterion.

Referring back to FIG. 5, in a step E55, the encoder simulates the encoding of the current block $B_c$ by intra-prediction, i.e. by spatial prediction. This mode consists of predicting the current block by interpolation from the values of the decoded pixels situated to the immediate left or immediately above the current block. In a known manner, the encoder selects the best intra-prediction mode for the current block $B_c$.

In a step E56, if the indicator activate_ibc is equal to 1, i.e. if the intra block copy encoding mode is activated, the encoder simulates this encoding mode.

According to the specific embodiment described here, this mode consists of searching the part of the current image stored in memory, in this case part A in FIG. 4, for a predictor block allowing the current block to be predicted. Use of this predictor block will be encoded by one or more syntax elements indicating the location of the predictor block in the part of the current image stored in memory. Then, in a conventional manner, a prediction residue between the current block and the predictor block is encoded, in a similar manner to inter-image encoding.

The encoding of the location of the predictor block in the stored part of the current image is described in more detail with reference to FIG. 7A.

According to one specific embodiment of the invention, the location of the predictor block is defined by a motion vector.

According to the invention, the encoding mode of the motion vector of the predictor block for this intra block copy encoding mode of the current block is different from the encoding of the motion vector of a conventional predictor block, i.e. from the encoding of the motion vector derived from a MERGE or AMVP mode. Several alternative embodiments are possible for encoding the motion vector derived from the intra block copy encoding mode. Examples of data streams encoding the motion vector obtained for this mode are shown in FIG. 7B-G.

More particularly, depending on the intra block copy encoding mode used for the current block, the reference image used to predict the current block is the current image. Thus, according to a first alternative, this encoding mode of the current block does not require the encoding of an index indicating the reference image, when an information item is encoded indicating that the encoding mode of the current block is the intra block copy mode. ibc_flag refers herein to the indicator that indicates that the encoding mode of the current block is the intra block copy mode. This alternative is shown in FIG. 7B-D.

According to another alternative, no information is encoded to indicate that the intra block copy encoding mode is used to predict the current block. This information is deduced, for example, from the value of the index of the reference image (indicator iRef in FIG. 7E-G) encoded in one of the MERGE or AMVP encoding modes, according to the alternative embodiment. When the index iRef of the reference image is equal to 0, such an index indicates that the current image is the reference image. According to this alternative, the encoding syntax of the motion vector of the MERGE or AMVP mode, as described with reference to FIG. 6B or 6C, differs depending on whether the reference image is the current image or another image.

With reference to FIG. 7A, according to one specific embodiment of the invention, in a step E70, a list of motion vectors is created. Such a list comprises, for example, the following 9 motion vectors: –(0, –H/2), (1, –H/2), (–1, –H/2), (0, –H/2–1), (1, –H/2–1), (–1, –H/2–1), (0, –H/2+1), (1, –H/2+1), (–1, –H/2+1), where H is the height of the current image.

It is understood that these motion vectors are selected because, if the regions A and B are two views of a stereoscopic video, it is highly likely that a good predictor block is located in an area of the region A that is close to the coordinates in the region B of the current block, hence the offset of –H/2 in the example shown here. FIG. 4 shows, by way of cross-hatched blocks, the possible predictor blocks pred with these motion vectors.

According to other specific embodiments of the invention, the list can be populated in a different manner, for example with a single motion vector, or with other vectors such as in the MERGE or AMVP modes.

In a step E71, the encoder will use a criterion (for example the rate-distortion cost) to select the motion vector from the list that will be used to predict the current block $B_c$. In the step E71, for each motion vector in the list, the encoder computes the rate-distortion cost associated with this motion vector by carrying out the steps of predicting, encoding and reconstructing the current block $B_c$ with this motion vector, and by encoding the motion vector, for example according to one of the specific embodiments shown in FIG. 7B-G.

According to one specific embodiment of the invention, no motion vector residue MVR is encoded in the stream.

According to an alternative, only one motion vector is possible, i.e. the list only comprises one motion vector. According to this alternative, this is the vector (0,–H/2), and this motion vector is always used when the current block is encoded by the intra block copy encoding mode. According to this alternative, an index (i_mvp) indicating the motion vector selected from the list does not need to be encoded.

According to another alternative, the list comprises a plurality of motion vectors. According to this alternative (shown in FIGS. 7C and 7F), an encoding syntax similar to that of the AMVP encoding mode is used, however the list of motion vectors is populated with predictors that are different from those of the AMVP encoding mode, for example the list created in step E70.

According to another alternative, the list comprises a plurality of motion vectors. According to this alternative (shown in FIG. 7B or 7G), a subset of the syntax elements of the AMVP encoding mode is used. For example, the index of the motion vector (i_mvp) in the list of motion vectors is encoded, then for each horizontal and vertical component of the motion vector to be encoded, a syntax element (MVRX0, MVRY0) indicating whether or not the component is equal to zero is encoded, as well as the sign (SGX, SGY) thereof where appropriate. If this syntax element indicates that the component is not equal to zero, a value 1 is automatically assigned thereto. The advantage of this alternative is that a sub-portion of the syntax elements of the conventional AMVP encoding mode is re-used, thus simplifying implementation.

According to another alternative, the list comprises a plurality of motion vectors. According to this alternative (shown in FIG. 7C, 7D, 7E or 7F), the same syntax elements as for the AMVP encoding mode (FIG. 7C or 7F) or the MERGE encoding mode (FIG. 7D or 7E) are encoded, however the entropy coding type used for the intra block copy encoding mode to encode these syntax elements is different. For example, Huffman-type encoding is used for the intra block copy encoding mode.

According to yet another alternative, the list comprises a plurality of motion vectors.

According to this alternative (shown in FIG. 7C, 7D, 7E or 7F), the same syntax elements as for the AMVP or MERGE encoding modes are encoded, and the entropy coding type used is also the same, in this case a context-based entropy coding, for example a CABAC-type encoding (Context-Based Adaptive Binary Arithmetic Coding), described in Detlev Marpe, Heiko Schwarz, and Thomas Wiegand "Context-Based Adaptive Binary Arithmetic Coding in the H.264/AVC Video Compression Standard", IEEE TRANSACTIONS ON CIRCUITS AND SYSTEMS FOR VIDEO TECHNOLOGY, VOL. 13, NO. 7, JULY 2003. According to this alternative, the contexts of the arithmetic encoder for encoding the motion vector of the intra block copy encoding mode are different from the contexts of the arithmetic encoder for encoding the motion vector of the MERGE or AMVP encoding modes.

In a step E72, the motion vector in the list created in step E70, that supplies the best criterion, in terms of rate/distortion, is selected for the intra block copy encoding mode.

It is understood that the location in the image to be encoded $I_c$ of the parts A and B depends on the arrangement of the views in the image, and thus potentially on the indicator "fp-type" when such an indicator is encoded in the data stream.

Referring back to FIG. 5, in a step E57, the encoder selects, for the current block $B_c$, from the different encoding modes simulated in the preceding steps, the encoding mode used to actually encode the current block. This is carried out by comparing the rate-distortion costs obtained for each encoding mode.

In a step E58, one or more syntax elements are encoded in the data stream in order to identify the encoding mode chosen in step E57 to encode the current block $B_c$.

According to an alternative embodiment of the invention, of the intra block copy encoding mode is activated, a syntax element ibc_flag is encoded for the current block $B_c$. The value thereof is 1 if the intra block copy encoding mode was selected in step E57; otherwise, this value is 0. According to one specific embodiment of the invention, this syntax element is only encoded for the blocks of part B of the image.

If the indicator ibc_flag is equal to 0, the syntax elements of the MERGE or AMVP encoding mode are encoded in a conventional manner, as shown in FIG. 6B or 6C. If the indicator ibc_flag is equal to 1, the syntax elements for encoding the motion vector of the current block $B_c$ are encoded according to one of the alternative embodiments described with reference to FIG. 7B-D.

According to another alternative, the syntax element ibc_flag is not encoded. If the encoding mode of the motion vector selected in step E57 is the MERGE or AMVP encoding mode, the syntax elements of the MERGE or AMVP encoding mode are encoded, for example, according to the syntax shown in FIG. 6B or 6C. It should be noted that according to this alternative, the encoding of the index iRef of the reference image is modified relative to conventional encoding, such that the value 0 for this index iRef is reserved for the intra block copy encoding mode and cannot be used for the MERGE or AMVP encoding modes.

If the intra block copy encoding mode was selected in step E57, the syntax elements for encoding the motion vector of the current block $B_c$ are encoded according to one of the alternative embodiments described with reference to FIG. 7E-G, whereby the index iRef of the reference image is assigned the value 0.

In a step E59, if the indicator activate_ibc is equal to 1, and if the current block $B_c$ belongs to part A of the image, then the reconstructed version of the current block $B_c$ is stored in a memory comprising images previously encoded-decoded and reconstructed, such as for example the memory MEM in FIG. 1A comprising images used for inter-prediction. The reconstructed version of the current block thus enables the subsequent blocks of the current image and/or the subsequent images for encoding to be predicted. The encoding method is iterated for the subsequent block of the current image to be encoded.

5.2.4 Method for Decoding an Image Sequence According to Another Specific Embodiment of the Invention The method is described here with reference to FIG. 8 for decoding a stream of encoded data representative of an image sequence according to one specific embodiment of the invention.

The data stream is considered to have been encoded according to any one of the specific embodiments described with reference to FIGS. 5 and 7A.

In a step E80, according to one specific embodiment of the invention, an indicator activate_ibc indicating whether the intra block copy is activated, is decoded from the data stream. Such an indicator activate_ibc can be decoded at each image of the video, or only once for a group of images of the video, or only once for the entire video.

For a current block to be decoded of the image $I_c$, the syntax elements corresponding to this current block are decoded from the data stream. These elements in particular comprise an indicator indicating the encoding mode that was used for the current block, and enabling the decoder to apply the appropriate decoding.

According to the specific embodiment described here, if the indicator activate_ibc is equal to 1, and if the current block belongs to a part B of the image, then in a step E80, a syntax element ibc_flag is decoded in order to determine whether the intra block copy encoding mode was used for the current block.

In the case whereby the current block was encoded using intra block copy mode, in a step E81, the motion vector of the current block is decoded according to the encoding alternative used to encode this information and as described with reference to FIG. 7A-G. Such decoding is thus different from that used in the case whereby the predictor block is derived from a conventional reference image.

In the case whereby the current block was encoded using a conventional inter encoding mode, in a step E82, the motion vector of the current block is decoded according to the encoding used to encode this information and as described with reference to FIG. 6A-C.

In a step E83, the current block is reconstructed using the predictor block identified by the motion vector decoded in step E81 or E82, and coefficients decoded from the data stream.

Figure 1B:
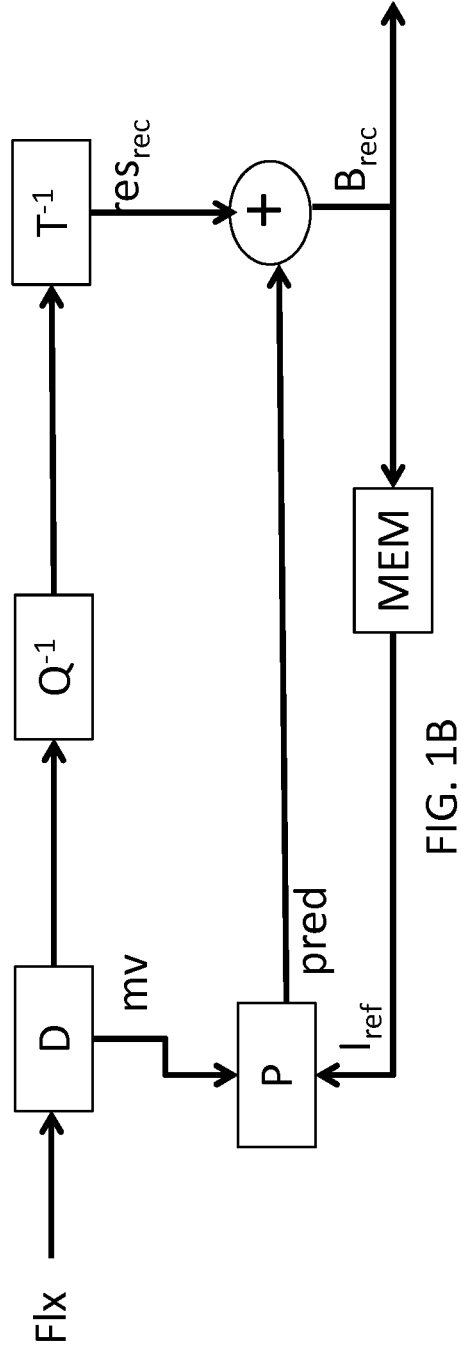

In a step E84, if activate_ibc is equal to 1, and if the current block belongs to part A of the image, then the reconstructed version of the current block is stored in a memory comprising the images previously encoded-decoded and reconstructed, such as for example the memory MEM in FIG. 1B comprising images used for inter-prediction. The reconstructed version of the current block thus enables the subsequent blocks of the current image and/or the subsequent images for decoding to be reconstructed. The decoding method is iterated for the subsequent block of the current image to be decoded.

5.2.5 Other Specific Embodiments of the Invention

The encoding and decoding methods described hereinabove also apply according to any one of the alternatives thereof in the case of image sequences representative of a stereoscopic video for which the left- and right-hand views are interlaced in the image sequence.

The indicator activate_ibc is thus representative of whether or not the encoding or decoding mode of the motion vector for the current block was activated using the encoding or decoding mode described with reference to FIG. 7A-G. In this specific embodiment of the invention, the steps described with reference to FIGS. 5 to 8 are similar, with the only difference residing in the reference image used for the encoding or decoding mode shown in FIG. 7A-G, which is thus the image of the complementary view of the current image. Methods for identifying such a reference image have already been described hereinabove.

The encoding and decoding methods described hereinabove also apply according to any of the alternatives thereof to the case of conventional 2D image sequences. The indicator activate_ibc is thus representative of whether or not the encoding or decoding mode of the motion vector for the current block was activated using the encoding or decoding mode described with reference to FIG. 7A-G. In this specific embodiment of the invention, the steps described with reference to FIGS. 5 to 8 are similar, with the only difference residing in the reference image used for the encoding or decoding mode shown in FIG. 7A-G, which is thus an image of a predetermined type, for example a so-called long-term image (also known as a long-term reference picture for the HEVC standard), identified by the number thereof in the video sequence and not, as for a conventional reference image, by the time offset thereof with the current image.

According to this specific embodiment of the invention, the blocks of the current image using long-term type reference images only use the AMVP mode. Therefore, the binary syntax element that indicates whether the MERGE or AMVP mode is used does not need to be encoded/decoded, according to certain alternative embodiments.

5.2.6 Device for Encoding an Image Sequence According to a Specific Embodiment of the Invention FIG. 9 shows the simplified structure of an encoding device COD adapted to implement the encoding method according to any one of the specific embodiments of the invention.

According to one specific embodiment of the invention, the steps of the encoding method are implemented by computer program instructions. For this purpose, the encoding device COD has the conventional architecture of a computer and in particular comprises a memory MEM1, a processing unit UT, equipped, for example, with a processor PROC, and controlled by the computer program PG stored in the memory MEM1. The computer program PG comprises instructions for implementing the steps of the encoding method as described hereinabove, when the program is executed by the processor PROC.

On start-up, the code instructions of the computer program PG are, for example, loaded in a memory before being executed by the processor PROC. The processor PROC of the processing unit UT in particular implements the steps of the encoding method described hereinabove, according to the instructions of the computer program PG.

According to another specific embodiment of the invention, the encoding method is implemented by function modules. For this purpose, the encoding device COD further comprises:

a first encoding module CD1 configured to encode an information item enabling, when decoding the current block, an information item to be obtained, which latter information item enables a reference image to be identified from a set of reference images, a second encoding module CD2 configured, when the reference image satisfies a predetermined criterion, to encode using a first encoding mode, a location information item of a predictor block of the reference image used to predict the current block, a third encoding module CD3 configured, when the reference image does not satisfy the predetermined criterion, to encode using a second encoding mode, location information, whereby the first and second encoding modes comprise at least one different encoding parameter, a fourth encoding module CD4 configured to encode a current block at least from the predictor block.

The processing unit UT cooperates with the different function modules described hereinabove and the memory MEM1 so as to implement the steps of the encoding method.

The different function modules described hereinabove can be in hardware and/or software form. In software form, such a function module can comprise a processor, a memory and program code instructions for implementing the function corresponding to the module when the code instructions are executed by the processor. In hardware form, such a function module can be implemented by any type of suitable encoding circuit such as, for example, without being limited thereto, microprocessors, digital signal processors (DSPs), application specific integrated circuits (ASICs), FPGA circuits (field programmable gate arrays), cabling of logical units, etc.

5.2.7 Device for Decoding an Image Sequence According to a Specific Embodiment of the Invention FIG. 10 shows the simplified structure of a decoding device DEC adapted to implement the decoding method according to any one of the specific embodiments of the invention.

According to one specific embodiment of the invention, the decoding device DEC has the conventional architecture of a computer and in particular comprises a memory MEM0, a processing unit UT0, equipped, for example, with a processor PROC0, and controlled by the computer program PG0 stored in the memory MEM0. The computer program PG0 comprises instructions for implementing the steps of the decoding method as described hereinabove, when the program is executed by the processor PROC0.

On start-up, the code instructions of the computer program PG0 are, for example, loaded in a memory before being executed by the processor PROC0. The processor PROC0 of the processing unit UT0 in particular implements the steps of the decoding method described hereinabove, according to the instructions of the computer program PG0.

According to another specific embodiment of the invention, the decoding method is implemented by function modules. For this purpose, the decoding device DEC further comprises:
- an obtaining module OBT configured to obtain an information item enabling the reference image to be identified from a set of reference images,
- a first decoding module DC1 configured, when the reference image satisfies a predetermined criterion, to decode the location information using a first decoding mode,
- a second decoding module DC2 configured, when the reference image does not satisfy the predetermined criterion, to decode the location information according to a second decoding mode, whereby the first and second decoding modes comprise at least one different decoding parameter,
- a reconstruction module REC configured to reconstruct the current block at least from the predictor block.

The processing unit UT0 cooperates with the different function modules described hereinabove and the memory MEM0 so as to implement the steps of the decoding method.

The different function modules described hereinabove can be in hardware and/or software form. In software form, such a function module can comprise a processor, a memory and program code instructions for implementing the function corresponding to the module when the code instructions are executed by the processor. In hardware form, such a function module can be implemented by any type of suitable decoding circuit such as, for example, without being limited thereto, microprocessors, digital signal processors (DSPs), application specific integrated circuits (ASICs), FPGA circuits, cabling of logical units, etc.

The invention claimed is:

1. A method comprising:
   decoding a data stream representative of an image sequence, wherein:
   the image sequence is representative of a stereoscopic video comprising, at each time instant, a left-hand view and a right-hand view, the images in the image sequence alternately corresponding to a left-hand view or a right-hand view of the stereoscopic video, and
   the decoding comprises the following acts implemented by a decoding device for at least one current block of a current image in the image sequence, said current block being encoded using a predictor block of a reference image, said predictor block being identified in the reference image via location information:
   obtaining an information item enabling the reference image to be identified from a set of reference images, said obtaining comprising:
     decoding the information item, which comprises an indicator indicating whether the location information of the predictor block for the current block must be decoded using a first decoding mode or a second decoding mode,
     when the location information is to be decoded using the first decoding mode, deducing the reference image from use of the first decoding mode, an index of the reference image being obtained from an index of the current image and depending whether the index of the current image is even or odd, the reference image corresponding to a view of the same time instant as the current image,
     when the location information is to be decoded using the second decoding mode, identifying the reference image by decoding, from the data stream, an identifier of the reference image,
   when the location information is to be decoded using the first decoding mode, decoding the location information using the first decoding mode,
   otherwise, decoding the location information using the second decoding mode, the first and second decoding modes comprising at least one different decoding parameter, and
   reconstructing the current block from the predictor block.

2. The method according to claim 1, wherein the location information corresponds to a motion vector, and wherein the first decoding mode creates a list of motion vectors comprising at least one of the following motion vectors:
   a motion vector pointing to a first block of the reference image spatially co-located with the current block of the current image,
   a motion vector pointing to a block of the reference image located above the first block,
   a motion vector pointing to a block of the reference image located to the left of the first block,
   a motion vector pointing to a block of the reference image located above and to the left of the first block,
   a motion vector pointing to a block of the reference image located to the right of the first block,
   a motion vector pointing to a block of the reference image located above and to the right of the first block,
   a motion vector pointing to a block of the reference image located below the first block,
   a motion vector pointing to a block of the reference image located below and to the right of the first block,
   a motion vector pointing to a block of the reference image located below and to the left of the first block.

3. The method according to claim 1, wherein decoding using the first decoding mode comprises:
   creating a list of motion vectors,
   decoding, from the data stream, an index identifying the motion vector from the motion vectors within the list to be used to identify the predictor block,
   decoding, from the data stream, an information item indicating whether a horizontal component or a vertical component, of the identified motion vector, is equal to zero,
   when the horizontal component, respectively the vertical component, of the identified motion vector is different from zero, allocating a value equal to 1 to the horizontal, respectively vertical, component.

4. The method according to claim 1, wherein:
   decoding using the first decoding mode and decoding using the second decoding mode both use the same syntax elements to signal the motion vector to be used to identify the predictor block, the first decoding mode and the second decoding mode using different types of entropy decoding, or
   when the first decoding mode and the second decoding mode use a same type of entropy decoding, whereby the same type of entropy decoding uses context-based decoding, the first decoding mode and the second decoding mode use different decoding contexts.

5. A decoding device comprising:
a processor;
a non-transitory computer-readable medium comprising instructions stored thereon, which when executed by the processor configure the decoding device to decode a data stream representative of an image sequence comprising at least one current block of a current image, wherein:
the image sequence is representative of a stereoscopic video comprising, at each time instant, a left-hand view and a right-hand view, the images in the image sequence alternately corresponding to a left-hand view or a right-hand view of the stereoscopic video,
the current block is encoded using a predictor block of a reference image, the predictor block being identified in the reference image via location information, and
the instructions configure the decoding device to decode the data stream by:
obtaining an information item enabling the reference image to be identified from a set of reference images, said obtaining comprising:
decoding the information item, which comprises an indicator indicating whether the location information of the predictor block for the current block must be decoded using a first decoding mode or a second decoding mode,
when the location information is to be decoded using the first decoding mode, deducing the reference image from use of the first decoding mode, an index of the reference image being obtained from an index of the current image and depending whether the index of the current image is even or odd, the reference image corresponding to a view of the same time instant as the current image,
when the location information is to be decoded using the second decoding mode, identifying the reference image by decoding, from the data stream, an identifier of the reference image,
when the location information is to be decoded using the first decoding mode, decoding the location information using the first decoding mode,
otherwise, decoding the location information according to the second decoding mode, the first and second decoding modes comprising at least one different decoding parameter, and
reconstructing the current block from the predictor block.
6. A method comprising:
encoding a data stream representative of an image sequence, wherein:
the image sequence is representative of a stereoscopic video comprising, at each time instant, a left-hand view and a right-hand view, the images in the image sequence alternately corresponding to a left-hand view or a right-hand view of the stereoscopic video, and
the encoding comprises the following acts performed by an encoding device for at least one current block of a current image in the image sequence:
encoding an information item enabling, when decoding the current block, the information item to be obtained, wherein the information item enables a reference image to be identified from a set of reference images, said information item comprising an indicator indicating whether location information of a predictor block for the current block must be decoded using a first decoding mode or a second decoding mode,
when the location information is to be decoded using the first decoding mode, said indicator enabling the reference image to be deduced from use of the first decoding mode, an index of the reference image being obtained from an index of the current image and depending whether the index of the current image is even or odd, the reference image corresponding to a view of the same time instant as the current image,
when the location information is to be decoded using the second decoding mode, encoding an identifier of the reference image,
when the location information is to be decoded using the first decoding mode, encoding using the first encoding mode, the location information of the predictor block of the reference image used to predict the current block,
otherwise, encoding using the second encoding mode, the location information, wherein the first and second encoding modes comprise at least one different encoding parameter, and
encoding the current block at least from the predictor block.
7. An encoding device comprising:
a processor;
a non-transitory computer-readable medium comprising instructions stored thereon, which when executed by the processor configure the encoding device to encode a data stream representative of an image sequence comprising at least one current block of a current image, wherein:
the image sequence is representative of a stereoscopic video comprising, at each time instant, a left-hand view and a right-hand view, the images in the image sequence alternately corresponding to a left-hand view or a right-hand view of the stereoscopic video,
the instructions configure the encoding device to encode the data stream by:
encoding an information item enabling, when decoding the current block, the information item to be obtained, wherein the decoded information item enables a reference image to be identified from a set of reference images, said information item comprising an indicator indicating whether location information of a predictor block for the current block must be decoded using a first decoding mode or a second decoding mode,
when the location information is to be decoded using the first decoding mode, said indicator enabling the reference image being deduced from use of the first decoding mode, an index of the reference image being obtained from an index of the current image and depending whether the index of the current image is even or odd, the reference image corresponding to a view of the same time instant as the current image,
when the location information is to be decoded using the second decoding mode, encoding an identifier of the reference image,
when the location information is to be decoded using the first decoding mode, encoding using the first encoding mode, the location information of the predictor block of the reference image used to predict the current block, otherwise, encoding using the second encoding mode, said location information, wherein the first and second encoding modes comprise at least one different encoding parameter, and encoding a current block from the predictor block.

8. A non-transitory computer-readable medium comprising a computer program stored thereon including instructions which when the program is executed by a processor of a decoding device, configure the decoding device to implement a method for decoding a data stream representative of an image sequence, wherein:

the image sequence is representative of a stereoscopic video comprising, at each time instant, a left-hand view and a right-hand view, the images in the image sequence alternately corresponding to a left-hand view or a right-hand view of the stereoscopic video, the current block is encoded using a predictor block of a reference image, said predictor block being identified in the reference image via location information, and the method comprises:

the decoding device performing the following acts for at least one current block of a current image in the image sequence:

obtaining an information item enabling the reference image to be identified from a set of reference images, said information item comprising an indicator indicating whether the location information of a predictor block for the current block must be decoded using a first decoding mode or a second decoding mode, when the location information is to be decoded using the first decoding mode, deducing the reference image from use of the first decoding mode, an index of the reference image being obtained from an index of the current image and depending whether the index of the current image is even or odd, the reference image corresponding to a view of the same time instant as the current image, when the location information is to be decoded using the second decoding mode, identifying the reference image by decoding, from the data stream, an identifier of the reference image, when the location information is to be decoded using the first decoding mode, decoding the location information using the first decoding mode, otherwise, decoding the location information using the second decoding mode, the first and second decoding modes comprising at least one different decoding parameter, and reconstructing the current block from the predictor block.

9. A non-transitory computer-readable medium comprising a computer program stored thereon including instructions which when the program is executed by a processor of an encoding device, configure the encoding device to implement a method for encoding a data stream representative of an image sequence, wherein:

the image sequence is representative of a stereoscopic video comprising, at each time instant, a left-hand view and a right-hand view, the images in the image sequence alternately corresponding to a left-hand view or a right-hand view of the stereoscopic video, and the method comprises the encoding device performing the following acts for at least one current block of a current image in the image sequence:

encoding an information item enabling, when decoding the current block, the information item to be obtained, wherein the information item enables a reference image to be identified from a set of reference images, said information item comprising an indicator indicating whether location information of a predictor block for the current block must be decoded using a first decoding mode or a second decoding mode, when the location information is to be decoded using the first decoding mode, said indicator enabling the reference image being deduced from use of the first decoding mode, an index of the reference image being obtained from an index of the current image and depending whether the index of the current image is even or odd, the reference image corresponding to a view of the same time instant as the current image, when the location information is to be decoded using the second decoding mode, encoding an identifier of the reference image, when the location information is to be decoded using the first decoding mode, encoding using the first encoding mode, the location information of the predictor block of the reference image used to predict the current block, otherwise, encoding using the second encoding mode, the location information, wherein the first and second encoding modes comprise at least one different encoding parameter, and encoding the current block at least from the predictor block.

\* \* \* \* \*